July 1, 1930.  H. DEDERING  1,768,670
COTTER PIN
Filed Dec. 21, 1927
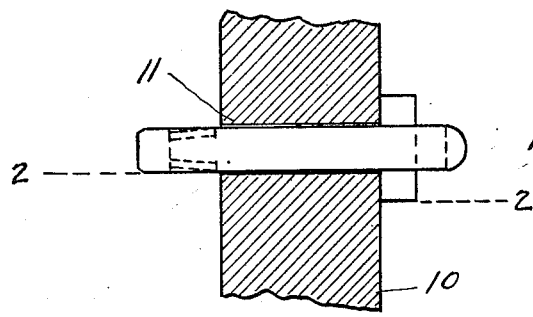
Fig. 1.
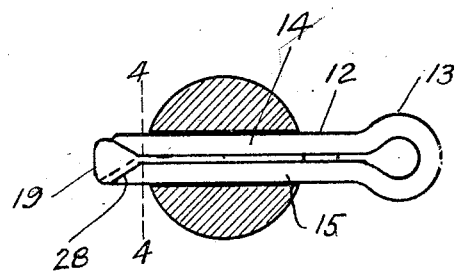
Fig. 2.
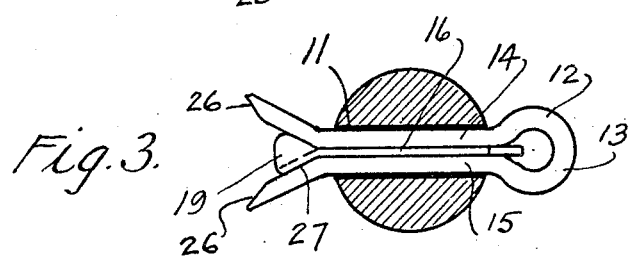
Fig. 3.
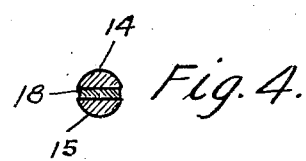
Fig. 4.
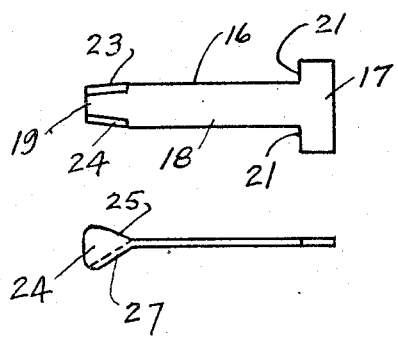
Fig. 6.
Fig. 7.
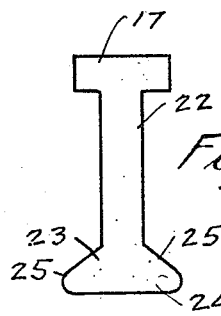
Fig. 5.
Inventor
Helmer Dedering
By
Gillson, Mann & Cox Atty's.

Patented July 1, 1930

1,768,670

UNITED STATES PATENT OFFICE

HELMER DEDERING, OF CHICAGO, ILLINOIS, ASSIGNOR, BY DIRECT AND MESNE ASSIGNMENTS, TO T & S CORPORATION, OF CHICAGO, ILLINOIS, A CORPORATION OF ILLINOIS

COTTER PIN

Application filed December 21, 1927. Serial No. 241,583.

This invention relates to cotter pin locking devices and the like.

The principal object of the invention is the provision of new and improved means for automatically spreading the ends of cotter pins upon the insertion of the same through suitable openings in the ends of bolts and the like.

Another object of the invention is the provision of a new and improved device whereby the ends of cotter pins may be spread with a minimum amount of time and labor.

A further object of the invention is the provision of a new and improved cotter pin spreader device that is cheap to manufacture, easily applied, efficient in operation, and that is not likely to become broken or accidentally detached while in use.

Other and further objects and advantages of the invention will appear from the following description taken in connection with the accompanying drawings, in which Fig. 1 is a longitudinal section of a bolt or other member having an aperture therethrough and showing the improved cotter pin in position therein;

Fig. 2 is a section on broken line 2—2 of Fig. 1 but showing the pin only partially inserted, the ends not being spread;

Fig. 3 is a similar view, but showing the cotter pin entirely inserted and with the ends spread apart;

Fig. 4 is a section of the cotter pin on line 4—4 of Fig. 2;

Fig. 5 is a plan view of a blank from which the spreader device is formed;

Fig. 6 is a plan view of the spreader device; and

Fig. 7 is a similar view at right angles to that shown in Fig. 6.

Referring now to the drawings, the reference character 10 designates a bolt or other member having a cotter pin opening 11 extending therethrough. The numeral 12 designates a cotter pin which may be and preferably is of the usual construction formed from a single length of half round metal wire and bent back on itself to form the loop 13 and the arms 14 and 15. The cotters may be in various sizes as is common in such constructions.

Means are provided for spreading one or both outer ends of the arms of the pin simultaneously with its insertion through the aperture 11. It is more or less difficult to spread the ends of cotter pins to prevent their accidental removal in use. The present invention contemplates the use of a simple spreader device for this purpose. In the form of the device selected to illustrate one embodiment of the invention, the spreader 16 comprises a head 17, a connecting or body portion 18 and a wedge portion 19 at its outer end. The body portion of the device is thin and preferably of a width not exceeding the diameter of the pin 12 whereby when in use between the arms of the cotter it will not materially increase the diameter of the pin. The head 17 is adapted to extend laterally at one or both sides to form one or more shoulders 21 for engaging the bolt or other member at each side of the aperture for limiting the inward movement of the device, as will presently appear.

The spreader member may be formed in any suitable manner as by forging or by stamping from sheet metal. In stamping the device from sheet metal, a blank 22 shown in Fig. 5 is first formed, having the head 17 at one end and having its other end flared outwardly, forming the wings 23 and 24 having the inclined edges 25. The wings 23 and 24 may then be bent at substantially right angles to the plane of the blank, as shown in Fig. 6. The inclined edges 25 will then form a wedging surface at one side of the plane of the body portion 18. If the device be used while in this condition it will cause one of the arms only to be bent outwardly.

Preferably, though not necessarily, the outer end of the device having the wings 23 and 24 may be bent in the opposite direction from the wings, as shown in Fig. 7, to form the inclined wedging surface 27 as indicated in Figs. 3 and 7.

The outer ends of the arms of the cotter pin are beveled for forming the wedge faces 26 converging inwardly. These wedge faces define a wedge shaped recess 28 for receiving the wedge portion 19 of the spreader member.

In use, the head of the spreader member is inserted in the recess 28 and the member forced rearwardly between the arms of the cotter pin until the wedge portion 19 seats in the recess 28 which is so formed as to receive the same without spreading the arms. The resiliency of the arms and loop 13 are such as to clamp and hold the spreader member in position between said arms.

In applying the cotter, the same, with the spreader member in position between the arms as indicated in Fig. 2, is inserted through the opening 11 until the shoulders 21 come in contact with the member 10, after which the cotter is forced inwardly as by striking the head with a hammer to cause the cotter to move inwardly relative to the spreader member, whereby the wedge portion 19 will bend the outer ends of the arms divergently outward as shown in Fig. 3 of the drawing.

It will be apparent from an inspection of the drawing that the pin will be prevented from withdrawal by the bent ends of the cotter, and the wedge members will prevent straightening of the bent portions thereby securely locking the pin in position in the aperture.

If desired the arms of the cotter may be so constructed that when the spreader member is in position the arms and spreader will be circular in cross-section instead of oblong, as shown in Fig. 4.

In order to facilitate the insertion of the cotter pin and spreader member in the openings, the outer end of the spreader member may be tapered slightly from each side as shown in Fig. 6. When the spreader member is stamped from sheet metal as shown on the drawing this may be accomplished by bending the wings 23 and 24 along lines converging outwardly.

While the spreader member is shown as being formed from sheet metal, it is understood it may be formed or made in other ways so long as one end has a shoulder for limiting the inward movement of the member and its other end a wedge portion for spreading the cotter arms, together with a suitable connecting portion for engaging between said arms.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a member having an opening therethrough, a cotter pin for engaging in said opening and means for automatically distorting a portion of the outer end of said pin simultaneously with the insertion of said pin in said aperture, said means comprising a sheet metal body portion inserted between the arms of said pin, said body portion having a lateral projection at one end for forming a shoulder and having an extension at its opposite end bent at an angle to said body portion and provided with an inclined edge surface for forming a wedge.

2. A cotter pin spreader device comprising a thin, narrow body portion terminating at one end in laterally extending members forming shoulders, and having on its opposite end wings bent at substantially right angles to the plane of said body portion and having inclined edges for forming a wedging surface.

3. A cotter pin spreader member comprising a sheet metal body portion having laterally extending projections on one end for forming shoulders, the opposite end portion of said member being bent to form a wedging surface, and wings on said end portion bent to extend in the opposite direction to that of said end portion and provided with inclined edges for cooperating with said wedging surface for forming a wedge member.

4. In combination, a conventional cotter pin, and a sheet metal spreader member between the arms of said cotter pin, said spreader member comprising a flat body portion, an outwardly extending laterally projection on its inner end extending outwardly beyond the contour of the arms of said pin, and a laterally extending wing on its outer end, said outer end being bent at an angle to the plane of said body portion and said wing being provided with an inclined edge for forming with the bent outer end of said body portion a wedge member for automatically spreading the outer ends of said arms during the insertion of said pin through an opening.

In testimony whereof I affix my signature.

HELMER DEDERING.

CERTIFICATE OF CORRECTION.

Patent No. 1,768,670.  Granted July 1, 1930, to

HELMER DEDERING.

It is hereby certified that error appears in the printed specification of the above numbered patent requiring correction as follows: Page 2, line 97, claim 4, strike out the word "laterally" and insert the same to follow after the word extending in line 98; and that the said Letters Patent should be read with this correction therein that the same may conform to the record of the case in the Patent Office.

Signed and sealed this 5th day of August, A. D. 1930.

Wm. A. Kinnan,
Acting Commissioner of Patents.

(Seal)